3,454,656
PROCESS FOR PRODUCING γ-HALOPROPYL-
IDENE-5H-DIBENZO[a,d]CYCLOHEPTENE
Robert D. Hoffsommer, Jr., and David Taub, Metuchen, and Norman L. Wendler, Summit, N.J., assignors to Merck & Co., Inc., Rahway, N.J., a corporation of New Jersey
No Drawing. Continuation-in-part of application Ser. No. 188,873, Apr. 19, 1962. This application May 6, 1966, Ser. No. 547,755
Int. Cl. C07c 25/22, 17/08
U.S. Cl. 260—649                6 Claims

ABSTRACT OF THE DISCLOSURE

Antidepressant drugs such as amitriptyline, nortriptyline, and related compounds, are prepared by reaction of 10,11-dihydro - 5H - dibenzocyclohepten-5-one or dibenzocyclohepten-5-one with a Grignard reagent derived from cyclopropyl halide; rearranging the resulting 5-cyclopropyl-5-hydroxy compound to produce the corresponding γ-hydroxypropylidene dibenzocycloheptene, followed by treatment of the γ-hydroxypropylidene derivative with a halogenating agent to give the corresponding γ-halopropylidene-5H-dibenzo[a,d]cycloheptene, and aminating said γ-halopropylidene compound by reaction with a lower aliphatic amine, e.g., 5-(γ-dimethylaminopropylidene)-5H-dibenzo[a,d]10,11-dihydrocycloheptene.

---

This application is a continuation-in-part of S.N. 188,873 filed Apr. 19, 1962, now Patent No. 3,272,864.

This invention relates to a novel method for making derivatives of dibenzocycloheptenes and, more particularly, the invention relates to a method of making 5H-dibenzo[a,d]cycloheptenes and 5H-dibenzo[a,d]10,11-dihydrocycloheptenes which are substituted at the 5-carbon atom with an aminopropylidene radical. The invention also includes the synthesis of intermediates used for obtaining these products.

The compounds of the invention are useful in the treatment of mental health conditions as they are antidepressants and serve as mood elevators or psychic energizers. For this purpose the daily dosage is within the range of 5 mg. to 250 mg., preferably taken in divided amounts over the day. The compounds are preferably administered in the form of their acid salts and these salts are included in the scope of this invention.

The compounds formed by the method of the invention may be represented by the general formula:

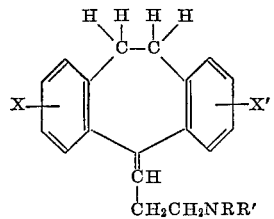

and

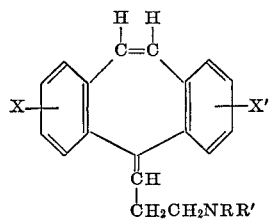

wherein X and X' may be similar or dissimilar and are selected from the group consisting of hydrogen, lower alkyl, lower alkoxy, lower alkenyl, haloloweralkyl, phenyl or substituted phenyl, an acyl group having up to 4 carbon atoms, haloacyl having up to 4 carbon atoms, amino, loweralkylamino, diloweralkylamino, acylamino having up to 4 carbon atoms, haloacylamino having up to 4 carbon atoms, a loweralkylsulfonylamino, halogen, hydroxyl, haloloweralkoxy, cyano, carboxy, carbamyl, loweralkylcarbamyl, diloweralkoxy, alkylmercapto, haloloweralkylmercapto, loweralkylsulfonyl, haloloweralkylsulfonyl, sulfamyl, loweralkylsulfamyl, diloweralkylsulfamyl; more than one of these substituents may be on each benzenoid ring.

R and R' are selected from the group consisting of hydrogen, lower alkyl radicals, lower alkenyl, cyclolower-alkyl, phenyl, benzyl and lower alkyl radicals inked together through an atom selected from the group consisting of carbon, nitrogen and oxygen to form a heterocyclic ring selected from the group consisting of 1-piperidyl, 1-pyrrolidyl, 4-morpholinyl and 1-loweralkyl-4-piperazinyl.

The method of the present invention may be illustrated schematically by the following flowsheet in which the dotted line indicates that the compound may be saturated (10,11 dihydro) or unsaturated at the 10,11 positions and X, X', R and R' are as previously defined:

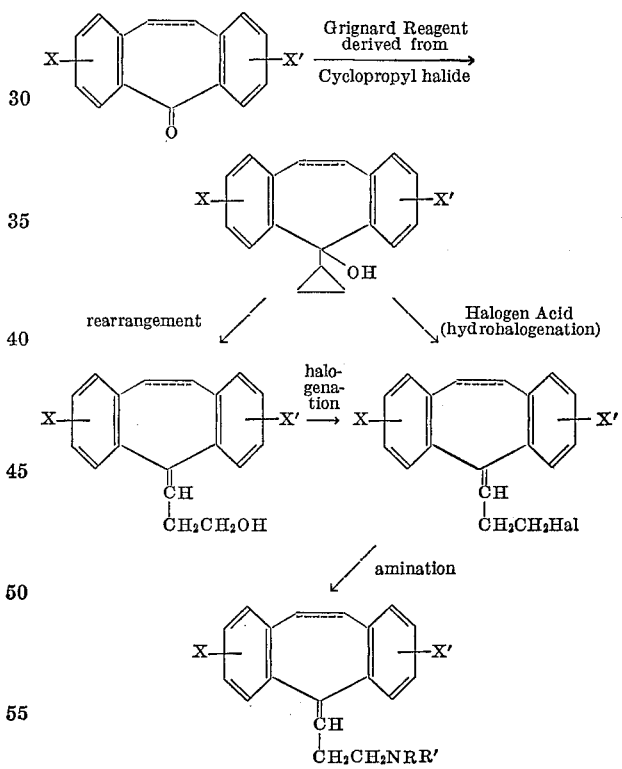

The method of the present invention begins with the known ketone which may be prepared by using processes described in the literature.

As shown in the flowsheet above, the first step in the method of the present invention involves the condensation of a 5H-dibenzo[a,d]cyclohepten-5-one with a Grignard reagent derived from a cyclopropylhalide to form the corresponding cyclopropyl carbinol, e.g. 5-cyclopropyl-5-hydroxy-5H-dibenzo[a,d]10,11-dihydrocycloheptene. In a typical run cyclopropylbromide in tetrahydrofuran is added dropwise with stirring to a quantity of magnesium in dry tetrahydrofuran to form cyclopropylmagnesium bromide. Then the ketone is added to the cyclopropylmagnesium bromide and the reaction mixture is refluxed for a suitable period of time to produce the cyclopropylcarbinol intermediate.

The next step in the method involves the rearrangement of the cyclopropylcarbinol to produce the corresponding γ - hydroxy - propylidenecycloheptene, e.g. 5 - (γ - hydroxypropylidene) - 5H - dibenzo[a,d]10,11 - dihydrocycloheptene. The γ-hydroxypropylidenecycloheptene is then treated with a halogenation agent to give the corresponding γ-halopropylidenecycloheptene derivative, e.g. 5 - (γ - bromopropylidene) - 5H - dibenzo[a,d]10,11-dihydrocycloheptene. The rearrangement and halogenation steps described above may be carried out simultaneously or separately. By treatment of the cyclopropylcarbinol with a hydrogen halide, as for example in acetic acid solution, the corresponding γ-halopropylidenecycloheptene may be formed directly in one step. It is preferred to employ HCl or HBr in effecting the rearrangement. The corresponding iodo derivative, when desired, preferably is formed from the chloro or bromo derivative by reacting the latter with sodium iodide in acetone under reflux. HI can be used, however.

On the other hand, the γ-hydroxypropylidenecycloheptene derivative itself may be isolated by treatment of the cyclopropylcarbinol with an acid that is not a halogen acid. Dilute perchloric acid in an inert organic solvent such as dioxane is a suitable reagent, although other acids including sulfuric acid, aqueous fluorosulfuric acid, phosphoric acid and an aromatic sulfonic acid, such as benzenesulfonic and p-toluenesulfonic acid may be used as well. Thereafter, the γ-hydroxy compound may be converted to the corresponding γ-halo propylidenecycloheptene by reaction with an appropriate halogenation agent, suitably thionyl chloride or phosphorus trichloride, although others may be used as well.

The rearrangement of the cyclopropylcarbinol is carried out in an inert organic solvent. The solvent can be a hydrocarbon, as for example an inert aromatic, aliphatic or cycloaliphatic hydrocarbon such as benzene, toluene, napthalene, n-hexane, n-hexadecane, mineral oil, cyclohexane and the like. Inert ethers, either aliphatic or alicyclic ethers, or hetero ethers, such as ethyl ether, dioxane, tetrahydrofuran can also be employed. Furthermore, weak inert organic acids can be used as a solvent for the rearrangement, e.g. acetic acid or another inert organic acid having a $pK_a$ no greater than that of acetic acid. When the rearrangement of the cyclopropylcarbinol is carried out with a non-hydrohalic acid it is preferred that the solvent be an inert water-miscible organic solvent for ease of handling of such acids.

Finally the γ-halopropylidenecycloheptene compound is converted to the desired aminopropylidene derivative by a process of amination. The amination may proceed by direct reaction of the halogen compound with an amine whereby the desired aminopropylidene compound is subsequently isolated as the hydrochloride. Alternatively, the desired amine derivative may be prepared by an amination reaction using potassium phthalimide followed by hydrazinolysis.

The examples which follow will more specifically illustrate the process of the present invention:

EXAMPLE 1

5-cyclopropyl-5-hydroxy-5H-dibenzo[a,d]-10,11-dihydrocycloheptene

To a 125 ml., 3-neck flask (flamed out and cooled under dry nitrogen) equipped with a stirrer, addition funnel, and ether-type condenser are charged 1.7 g. (0.070 mole) of clean magnesium turnings and 15 ml. of dry tetrahydrofuran (THF). 8.5 g. (0.0702) mole of cyclopropylbromide in 15 ml. of dry THF is added, dropwise with stirring, at a rate sufficient to maintain a gentle reflux. Gentle warming and stirring for about 30 minutes is needed to start the reaction, after which no external heat is required. Stirring and refluxing is continued until all the metal is gone. The reaction mixture is then cooled below the point of reflux, but not so low as to cause the Grignard reagent to precipitate, and 7.3 g. (0.0351) mole of 5H-dibenzo[a,d]-10,11-dihydrocyclohepten-5-one in 20 ml. of dry THF is added with stirring in 15 minutes. The reaction mixture is stirred and refluxed for 6 hours, with 0.5 ml. aliquots withdrawn and worked up each hour for thin layer chromatography (TLC) to follow the reaction. TLC indicates that the reaction is complete in 1 hour, indeed all of the probes spontaneously crystallize upon standing. The reaction mixture (6 hours) is chilled in an ice bath and treated with 45 ml. of saturated ammonium chloride solution. The layers are separated and just enough water is added to dissolve the solid salts in the aqueous layer. The latter is extracted with 2× 25 ml. of ether. The combined organic layers are washed with 25 ml. of saturated salt solution, dried over magnesium sulfate and taken to dryness in vacuo to yield 9.88 g. of a yellow-orange oil. Treatment of this oil with charcoal, in ether, and crystallization from petroleum ether yields 5.49 g. (62.5%) of crude crystalline cycloporpyl carbinol, single spot by TLC. Further recrystallization yields material melting at 72.8–73.8° C.;

$\lambda_{max.}^{MeOH}$ 2630, E 1% cm. 24

*Analysis.*—Calculated for $C_{18}H_{18}O$: C, 86.36; H, 7.24. Found: C, 86.43; H, 7.40.

EXAMPLE 2

5-cyclopropyl-5-hydroxy-5H-dibenzo[a,d]cycloheptene

Following the procedure described in detail in Example 1 and using equivalent quantities of 5H-dibenzo[a,d]cyclohepten-5-one there is produced the corresponding 5-cyclopropyl-5-hydroxy-5H-dibenzo[a,d]-cycloheptene.

EXAMPLE 3

5-cyclopropyl-5-hydroxy-5H-dibenzo[a,d]cycloheptene

A mixture of 2.43 g. (0.10 millimole) of magnesium turnings and 25 ml. of dry tetrahydrofuran was charged to a 250 ml. 3-neck flask (previously "flamed out" with a heat gun and cooled under dry nitrogen) fitted with a stirrer, addition funnel, and reflux condenser with a nitrogen inlet. To this stirred mixture was added a solution of 13.3 g. (0.110 millimole) of cyclopropyl bromide in 25 ml. of dry tetrahydrofuran, dropwise at such a rate as to just maintain a gentle reflux (heating required to initiate reaction). Upon completion of the halide addition (45 minutes) the reaction mixture was stirred and refluxed under nitrogen for 2½ hours until the magnesium metal was essentially completely consumed. The temperature was then lowered to just below reflux and 10.31 g. (0.05 millimole) of 5H-dibenzo[a,d]cyclohepten-5-one in 30 ml. of dry tetrahydrofuran was added, rapidly with stirring (addition complete in 8 minutes), after which the reaction mixture was stirred and refluxed for 1½ hours. The mixture was then chilled in an ice bath and treated with 75 ml. of saturated ammonium chloride solution, followed by just enough water to dissolve the precipitated inorganic salts. The layers were separated and the aqueous layer extracted with 2×40 ml. of ether. The combined organic extracts were washed with 35 ml. of saturated sodium chloride solution, dried over anhydrous magnesium sulfate, and concentrated to dryness in vacuo to yield an oil which crystallized on final pumping with an oil pump. This solid residue was dissolved in ether, treated with charcoal, filtered through Celite, and boiled down while slowly replacing ca. 90% of the ether with hexane. Upon cooling the concentrated solution 10.48 g. (84.5%) of crystalline 5 - cyclopropyl - 5H-dibenzo[a,d] cyclohepten-5-ol, M.P. 90–94° C., was obtained. Recrystallization of a sample afforded material with the follwering properties: M.P. 94–96° C.;

$\lambda_{max.}^{MeOH}$ 2930 (ε 14,575) 2250 (ε 24,000), 2120 (ε 30,800)

Calc. for $C_{18}H_{16}O$: C, 87.06; H, 6.49. Found: C, 86.51; H, 6.34.

EXAMPLE 4

5-(γ-bromopropylidene)-5H-dibenzo[a,d]-10,11-dihydrocycloheptene

5 - cyclopropyl - 5 - hydroxy-5H-dibenzo[a,d]-10,11-dihydrocycloheptent (1.3 g., 5.19 millimoles) is dissolved in 20 ml. of glacial acetic acid in a 100 ml. flask and the solution is chilled to 10° C. HBr/acetic acid (10 ml. of a 15% solution) is added with stirring and the reaction mixture is stirred at 10–15° C. for 0.5 hour. The reaction mixture is then filtered cold and the crystalline product is air dried to yield 730 ml. (45%) of first crop bromide melting 71.0–71.8° C. The filtrate is chilled and diluted with 40 ml. of water to yield 880 mg. of crude second crop which, on recrystallization from petroleum-ether containing a small amount of ether, yields 780 mg. of crystalline material melting 69.2–71.6° C. Total crystalline product aamounts to 1.51 g. (92.5%) which exhibits the following properties:

$\lambda_{max.}^{MeOH}$ 2400, E 1% cm. 565; $\lambda_{max.}^{CHCl_3}$ 3.27, 3.35, 343, 6.1 6.21 and 6.34μ

*Analysis.*—Calculated for $C_{18}H_{17}Br$: C, 69.01; H, 5.47; Br, 25.51. Found: C, 68.95; H, 5.15; Br, 25.57.

EXAMPLE 5

5-(γ-bromopropylidene)-5H-dibenzo[a,d]cycloheptene

Following the procedure described in detail in Example 4 and using equivalent quantities of 5-cyclopropyl-5-hydroxy-5H-dibenzo[a,d]cycloheptene there is produced the corresponding 5 - (γ-bromopropylidene)-5H-dibenzo[a,d]cycloheptene.

EXAMPLE 6

5-(γ-chloropropylidene)-5H-dibenzo[a,d]-10,11-dihydrocycloheptene

5 - cyclopropyl - 5 - hydroxy-5H-dibenzo[a,d]-10,11-dihydrocycloheptene (100 ml., 0.4 millimole) is dissolved in 5 ml. of glacial acetic acid in a 25 ml. flask with a magnetic stirring bar, and the solution is cooled to 10° C. HCl/acetic acid (1 ml. of a 15% solution) is added with stirring and the reaction mixture is stirred at 10–15° C. for 3 hours. Aliquots are withdrawn at intervals for spotting on Thin-Layer Chromatography plates, indicating that the reaction is complete within 15 minutes. The reaction mixture is concentrated to dryness in vacuo at room temperature and flushed 3 times with benzene. The crystalline residue is treated with charcoal and recrystallized from ether/petroleum ether to yield a crystalline product with the following properties: M.P. 83–84° C.;

$\lambda_{max.}^{MeOH}$ 2400, E 1% cm. 516

*Analysis.*—Calculated for $C_{18}H_{17}Cl$: C, 80.43; H, 6.37; Cl, 13.19. Found: C, 79.98; H, 6.50; Cl, 13.10.

EXAMPLE 7

5-(γ-chloropropylidene)-5H-dibenzo[a,d]cycloheptene

Following the procedure described in detail in Example 6 and using equivalent quantities of 5-cyclopropyl-5-hydroxy-5H-dibenzo[a,d]cycloheptene there is produced the corresponding 5 - (γ-chloropropylidene)-5H-dibenzo[a,d]cycloheptene.

EXAMPLE 8

5-(γ-chloropropylidene)-5H-dibenzo[a,d]cycloheptene

A solution of 1.0 g. (4.04 millimoles) of 5-cyclopopyl-5-hydroxy-5H-dibenzo[a,b]cycloheptane in 5 ml. of glacial acetic acid in a 25 ml. flask with stirring bar was cooled to 10° C. and treated with 2.85 ml. of a glacial acetic acid solution containing 149 mg. of anhydrous HCl/ml. A crystalline precipitate formed within one minute and the mixture was stirred at 10–15° C. for 0.5 hour. The crystalline solid was then filtered, washed with a small amount of cold glacial acetic acid, and dried in vacuo at 50° C. to yield 825 mg. (76%) of 5-(γ-chloropropylidene)-5H-dibenzo[a,d]cycloheptene with the following properties: M.P. 92–94° C.;

$\lambda_{max.}^{MeOH}$ 2910 (ε 10,600), 2400 (ε 22,800) 2240 (ε 38,400)

Calc. for $C_{18}H_{15}Cl$: Cl, 13.29. Found: Cl, 13.23.

EXAMPLE 9

5-(γ-iodopropylidene)-5H-dibenzo[a,d]-10,11-dihydrocycloheptene

A solution of 200 mg. (0.636 millimole) of 5-(γ-bromopropylidene)-5H-dibenzo[a,d]-10,11-dihydrocycloheptene and 360 ml. (2.4 millimoles) of sodium iodide in 10 mg. of acetone is refluxed for 18 hours. The reaction mixture is then cooled to room temperature and filtered to remove the precipitated NaBr, which amounts to 60 mg. (91.5% of theory). The filtrate is concentrated to dryness and the residue is triturated with water to yield an oily mixture. This mixture is extracted with ether, the ether solution is washed with saturated salt solution, dried over magnesium sulfate, treated with charcoal, filtered through Celite and crystallization attempted from ether/pet. ether. The oil crystallizes after standing overnight to yield 210 mg. (93% yield) of material, M.P. 54–60° C. This product is recrystallized from pet. ether to give 170 mg. of material, M.P. 56.2–59° C., which has $\lambda_{max.}^{MeOH}$ 2425, E 1% cm. 410

*Analysis.*—Calculated for $C_{18}H_{17}I$: C, 60.01; H, 4.75; I, 35.23. Found: C, 59.87; H, 4.70; I, 35.55.

EXAMPLE 10

5-(γ-iodopropylidene)-5H-dibenzo[a,d]cycloheptene

Following the procedure described in detail in Example 9 and using equivalent quantities of 5-(γ-bromopropylidene)-5H-dibenzo[a,d]cycloheptene there is produced the corresponding 5-(γ-iodopropylidene)-5H-dibenzo[a,d]cycloheptene.

EXAMPLE 11

5-(γ-hydroxypropylidene)-5H-dibenzo[a,d]-10,11-dihydrocycloheptene 500 mg. of 5-cyclopropyl-5-hydroxy-5H-dibenzo[a,d]-10,11-dihydrocycloheptene in 15 ml. of dioxane is treated with 9 ml. of 2 M perchloric acid, at room temperature, for a total of 6 hours. Samples for TLC are withdrawn after 1, 3 and 6 hours, and show the reaction to be complete and clean at 1 hour, with no further change after 6 hours. Work-up of the reaction mixture yields a crude solid which, after recrystallization, yields 320 mg. (64% yield) of alcohol having the following characteristics; M.P. 89–90.2° C.;

$\lambda_{max.}^{MeOH}$ 2375, $E_{5548}^{1\% cm.}$ $\lambda_{max.}^{CHCl_3}$ 2.73, 2.9, 3.25, 3.31, 6.2, 6.34 and 9.6μ

Calculated for $C_{18}H_{18}O$: C, 86.36; H, 7.24. Found: 6.34 and 9.6μ

EXAMPLE 12

5-(γ-hydroxypropylidene)-5H-dibenzo[a,d]cycloheptene

Following the procedure described in detail in Example 11 and using equivalent quantities of 5-cyclopropyl-5-hydroxy-5H-dibenzo[a,d]cycloheptene there is produced the corresponding 5-(γ-hydroxypropylidene)-5H-dibenzo[a,d]cycloheptene.

EXAMPLE 13

5-(γ-hydroxypropylidene)-5H-dibenzo[a,d]cycloheptene

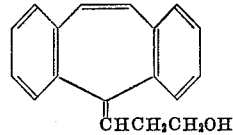

A solution of 2.0 g. (8.08 millimoles) of 5-cyclopropyl-5-hydroxy-5H-dibenzo[a,d]cycloheptene in 60 ml. of dioxane in a 100 ml. flask, with stirring bar was treated, at room temperature, with 36 ml. of a 2 M aqueous perchloric acid solution (ice bath cooling required to hold temperature at 25° C.). The clear reaction mixture was stirred at room temperature. After 1 hour a fine solid precipitate appeared, which, after 2 hours more was removed by filtration. The filtrate was diluted with 200 ml. of ether and treated with excess solid potassium bicarbonate, followed by anhydrous magnesium sulfate. The mixture was filtered and the filtrate concentrated to dryness in vacuo to yield 5-(γ-hydroxypropylidene)-5H-dibenzo[a,d]cycloheptene as a viscous oil in quantitative yield with the following properties: B.P. 160–162° C./ 0.13 mm.;

$\lambda_{max.}^{MeOH}$ 2900 (ε 10,080), 2420 (ε 23,200), 2225 (ε 38,600)

EXAMPLE 14

5-(γ-chloropropylidene)-5H-dibenzo[a,d]-10,11-dihydrocycloheptene

Treatment of a solution of 50 mg. of 5-(γ-hydroxypropylidene)-5H-dibenzo[a,d]-10,11-dihydrocycloheptene in 3 ml. of dry benzene containing one drop of pyridine with 65 mg. of thionylchloride in 2 ml. of dry benzene and refluxing for 3 hours on a steam bath yields a crystalline product, M.P. 78–79° C. which, by TLC and mixed M.P. (78–81° C.) was shown to be identical with the compound obtained from treatment of 5-hydroxy-5-cyclopropyl - 5H - dibenzo[a,d] - 10,11 - dihydrocycloheptene with HCl/acetic acid.

EXAMPLE 15

5-(γ-chloropropylidene)-5H-dibenzo[a,d]cycloheptene

Following the procedure described in detail in Example 14 and using equivalent quantities of 5-(γ-hydroxypropylidene)-5H-dibenzo[a,d]cycloheptene there is produced the corresponding 5-(γ-chloropropylidene)-5H-dibenzo[a,d]cycloheptene.

EXAMPLE 16

5-(γ-dimethylaminopropylidene)-5H-dibenzo[a,d]-10,11-dihydrocycloheptene HCl

A solution of 100 mg. (0.372 millimole) of 5-(γ-chloropropylidene) - 5H - dibenzo[a,d] - 10,11 - dihydrocycloheptene in 1 ml. of benzene in a thick-walled Pyrex tube is saturated with dimethylamine at 10° C. The tube is sealed, allowed to stand at 95° C. for 18 hours, then cooled and opened. The benzene solution is washed successively with 5% potassium bicarbonate, water and saturated salt solution, dried over magnesium sulfate, and taken to dryness in vacuo. The residual oil is dissolved in ether and treated with ether saturated with HCl. The resulting mixture of oil and ether is blown dry to remove the excess HCl, and the residue upon trituration with ether yields crystalline 5-(γ-dimethylaminopropylidene)-5H - dibenzo[a,d] - 10,11 - dihydrocycloheptene material, M.P. 190–192° C.

$\lambda_{max.}^{MeOH}$ 2400, E 1% cm. 437

Analysis.—Calculated for $C_{20}H_{24}NCl$: C, 76.53; H, 7.71; N, 4.46. Found: C, 76.24; H, 7.63; N, 4.58.

EXAMPLE 17

5-(γ-dimethylaminopropylidene)-5H-dibenzo[a,d]cycloheptene HCl

Following the procedure described in detail in Example 16 and using equivalent quantities of 5-(γ-chloropropylidene)-5H-dibenzo[a,d]cycloheptene there is produced the corresponding 5-(γ-dimethylaminopropylidene)-5H-dibenzo[a,d]cycloheptene HCl.

EXAMPLE 18

5-(γ-methylaminopropylidene)-5H-dibenzo[a,d]-10,11-dihydrocycloheptene HCl

A solution of 100 mg. (0.372 millimole) of 5-(γ-chloropropylidene) - 5H - dibenzo[a,d] - 10,11 - dihydrocycloheptene in 1.5 ml. of benzene is saturated with monomethylamine at 10° C. in a thick-walled Pyrex tube. The tube is sealed, allowed to stand at 95° C. for 18 hours, then cooled and opened. The benzene solution is washed successively with 5% potassium bicarbonate, water and saturated salt solution, dried over magnesium sulfate, and taken to dryness in vacuo. The residual oil is dissolved in 3 ml. of ether and treated with 3 ml. of ether saturated with HCl. The resulting mixture of oil and ether is blown dry to remove the excess HCl. Trituration of the residue in ether yields a crystalline crude, M.P. 200–210° C., which after recrystallization from ether-ethanol, produces crystals, M.P. 213–215° C.

Analysis.—Calculated for $C_{19}H_{22}NCl$: C, 76.10; H, 7.39; N, 4.67. Found: C, 75.61; H, 7.05; N, 4.38.

EXAMPLE 19

5-(γ-methylaminopropylidene)-5H-dibenzo[a,d]cycloheptene HCl

Following the procedure described in detail in Example 18 and using equivalent quantities of 5-(γ-chloropropylidene)-5H-dibenzo[a,d]cycloheptene there is produced the corresponding 5-(γ-methylaminopropylidene)-5H-dibenzo[a,d]cycloheptene HCl.

EXAMPLE 20

Substituted 5-cyclopropyl-5-hydroxy-5H-dibenzo[a,d]-10,11-dihydrocycloheptenes

Following the procedure described in detail in the above Examples 1 through 19 and using equivalent quantities of the corresponding 5H-dibenzo[a,d]-10,11-dihydrocyclohepten-5-ones and 5H-dibenzo-cyclohepten-5-ones substituted with the nuclear substituents X and X' given above there are produced the corresponding substituted 5-cyclopropyl - 5 - hydroxy - 5H - dibenzo[a,d] - 10,11 - dihydrocycloheptenes and substituted 5-cyclopropyl-5-hydroxy-5H-dibenzo[a,d]cycloheptenes.

EXAMPLE 21

Substituted 5-cyclopropyl-5-hydroxy-5H-dibenzo[a,d]cycloheptenes

Following the procedure described in detail in the above Examples 1 through 20 and using equivalent quantities of the corresponding 5H-dibenzo[a,d]cyclohepten-5-ones and 5H-dibenzo[a,d]cyclohepten-5-ones substituted with the nuclear substituents X and X' given above in the general formula there are produced compounds corresponding to the aminopropylidene compounds formed in the above examples.

EXAMPLE 22

5-(γ-aminopropylidene)-5H-dibenzo[a,d]-10,11-dihydrocycloheptene HCl

A solution of 1.0 g. (3.19 millimole) of 5-(γ-bromopropylidene) - 5H - dibenzo[a,d] - 10,11-dihydrocycloheptene in 25 ml. of absolute ethanol in a Carius tube is saturated with anhydrous ammonia at 0° C. The tube is sealed, allowed to stand at 100° C. for 18 hours, then cooled and opened. The clear, light-tan ethanol solution is taken to dryness in vacuo, the residue treated with charcoal, in ethanol, filtered and again taken to dryness in vacuo. Trituration of the residue with benzene yielded 900 mg. of crystalline material. 500 mg. of this material is dissolved in 50 ml. of hot water, the resulting cloudy solution filtered, the filtrate cooled and treated with 5% potassium bicarbonate solution (neutralization followed with a pH meter—complete at pH 9). The aqueous mixture is extracted with 3×20 ml. of ethyl acetate, the combined extracts dried over magnesium sulfate and taken to dryness in vacuo. The residual oil is dissolved in 18 ml. of ether and treated with 8 ml. of ether saturated with HCl to form a white precipitate. This mixture is blown to dryness with nitrogen to remove the excess HCl, the residue triturated with ether and chilled to yield 230 mg. of crude solid. Recrystallization from ethanol yields 120 mg. of crystalline product with M.P. 258–263° C. and $\lambda_{max.}^{MeOH}$ 2390, E 1% cm. 480

*Analysis.*—Calculated for $C_{18}H_{20}NCl$: C, 75.65; H, 7.05; Cl, 12.40. Found: C, 75.35; H, 7.33; Cl, 12.19.

EXAMPLE 23

5-(γ-aminopropylidene)-5H-dibenzo[a,d]cycloheptene HCl

Following the procedure described in detail in Example 22 and using equivalent quantities of 5-(γ-bromopropylidene)-5H-dibenzo[a,d]cycloheptene there is produced the corresponding 5 - (γ - aminopropylidene) - 5H - dibenzo[a,d]cycloheptene HCl.

EXAMPLE 24

5-cyclopropyl-5-hydroxy-3-methylsulfonyl-5H-dibenzo [a,d]cycloheptene

A mixture of 2.43 g. (0.10 millimole) of magnesium turnings and 25 ml. of dry tetrahydrofuran is charged to a 250 ml. 3-neck flask (previously "flamed out" with a heat gun and cooled under dry nitrogen) fitted with a stirrer, addition funnel, and reflux condenser with a nitrogen inlet. To this stirred mixture is added a solution of 13.3 g. (0.110 millimole) of cyclopropyl bromide in 25 ml. of dry tetrahydrofuran, dropwise at such a rate as to just maintain a gentle reflux (heating required to initiate reaction). Upon completion of the halide addition the reaction mixture is stirred and refluxed under nitrogen until the magnesium metal is essentially completely consumed. The temperature is then lowered to just below reflux and 10.31 g. (0.05 millimole) of 3-methylsulfonyl-5H-dibenzo[a,d]cyclohepten-5-one in 30 ml. of dry tetrahydrofuran is added, rapidly with stirring, after which the reaction mixture is stirred and refluxed for about 1½ hours. The mixture is then chilled in an ice bath and treated with 75 ml. of saturated ammonium chloride solution, followed by just enough water to dissolve the precipitated inorganic salts. The layers are separated and the aqueous layer extracted with 2×40 ml. of ether. The combined organic extracts are washed with 35 ml. of saturated sodium chloride solution, dried over anhydrous magnesium sulfate, and concentrated to dryness in vacuo to yield an oil which crystallizes on final pumping with an oil pump. This solid residue is dissolved in ether, treated with charcoal, filtered through celite, and boiled down while slowly replacing ca. 90% of the ether with hexane. The concentrated solution is cooled to yield crystalline 5-cyclopropyl-5-hydroxy-3-methylsulfonyl-5H-dibenzo[a,d]cycloheptene. This product is purified by recrystallization.

EXAMPLE 25

5-(γ-chloropropylidene)-3-methylsulfonyl-5H-dibenzo [a,d]cycloheptene

A solution of 1.0 g. (4.04 millimoles) of 5-cyclopropyl-5-hydroxy-3 - methylsulfonyl - 5H - dibenzo[a,d]cycloheptene in 5 ml. of glacial acetic acid in a 25 ml. flask with stirring bar is cooled to 10° C. and treated with 2.85 ml. of a glacial acetic acid solution containing 149 mg. of anhydrous HCl/ml. A crystalline precipitate quickly forms and the mixture is stirred at 10–15° C. for 0.5 hour. The crystalline solid is then filtered, washed with a small amount of cold glacial acetic acid, and dried in vacuo at 50° C. to yield 5-(γ - chloropropylidene) - 3-methylsulfonyl-5H-dibenzo[a,d]cycloheptene with the following properties: M.P. 92–94° C.;

$\lambda_{max.}^{MeOH}$ 2910 ($\epsilon$ 10,600), 2400 ($\epsilon$ 22,800), 2240 ($\epsilon$ 38,400)

Calcd. for $C_{18}H_{15}Cl$: Cl, 13.29. Found: Cl, 13.23.

EXAMPLE 26

3-methylsulfonyl-5H-dibenzo[a,d]cyclohepten-5-one 3-methylmercapto-5H-dibenzo[a,d]cyclohepten-5 - one (10.70 g., 0.042 mole) is dissolved in 35 ml. of glacial acetic acid. Hydrogen peroxide (30%, 15 ml.) is added and the solution is stirred at room temperature for 65 hours. The white solid that precipitates is collected and dried to yield 10.81 g. (91%) of product melting at 158–159° C. An analytical sample from a previous experiment melts at 155–157.5° C. after recrystallization from 95% ethanol.

*Analysis.*—Calcd. for $C_{16}H_{12}O_3S$: C, 67.59; H, 4.26; S, 11.28. Found: C, 67.62; H, 4.25; S, 11.41.

What is claimed is:

1. A process for preparing a compound selected from the group consisting of compounds of the structural formulae

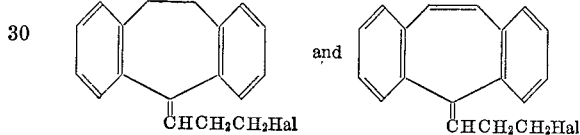

wherein Hal is selected from the group consisting of chlorine, bromine and iodine, which comprises reacting a compound selected from the group consisting reacting a compound selected from the group consisting of 5-cyclopropyl-5-hydroxy - 5H - dibenzo[a,d]cycloheptene and 5-cyclopropyl-5-hydroxy-5H-dibenzo[a,d]-10,11 - dihydrocycloheptene, in an inert organic solvent with a hydrogen halide selected from the group consisting of hydrogen chloride, hydrogen bromide and hydrogen iodide.

2. A process for preparing a compound selected from the group consisting of compounds of the structural formulae

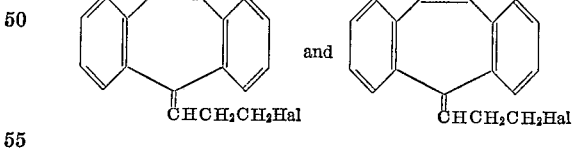

wherein Hal is selected from the group consisting of chlorine, bromine and iodine, which comprises reacting a compound selected from the group consisting of 5-cyclopropyl-5 - hydroxy - 5H - dibenzo[a,d]cycloheptene and 5-cyclopropyl-5-hydroxy-5H-dibenzo[a,d]-10,11 - dihydrocycloheptene, with an acid other than a hydrohalogen acid, in an inert organic solvent and then treating the resulting 5-(γ-hydroxypropylidene) derivative in an inert organic solvent with a halogenating agent, the halogen portion of which is selected from the group consisting of chlorine, bromine and iodine.

3. The process of claim 1 wherein said solvent is acetic acid.

4. The process of claim 1 wherein Hal is chlorine or bromine and said hydrogen halide is hydrogen chloride or hydrogen bromide.

5. The process of claim 2 wherein said acid is perchloric acid.

6. A process for preparing a 5 - (γ - halopropylidene) derivative of a 5H-dibenzo[a,d]-10,11 - dihydrodibenzocycloheptene or a 5H - dibenzo[a,d]cycloheptene which comprises reacting a 5-cyclopropyl-5-hydroxy-5H-dibenzo[a,d]-10,11-dihydrocycloheptene or a 5-cyclopropyl - 5-hydroxy-5H-dibenzo[a,d]cycloheptene in an inert organic solvent with a hydrogen halide selected from the group consisting of hydrogen chloride, hydrogen bromide and hydrogen iodide.

References Cited

UNITED STATES PATENTS 3,272,864  9/1966  Hoffsommer et al. __ 260—570.8

CHARLES B. PARKER, *Primary Examiner.*

D. R. PHILLIPS, *Assistant Examiner.*